US012370102B1

(12) United States Patent
Huang et al.

(10) Patent No.: US 12,370,102 B1
(45) Date of Patent: Jul. 29, 2025

(54) FOLDABLE ELECTRIC WHEELCHAIR

(71) Applicant: FOSHAN DAHAO MEDICAL TECHNOLOGY CO., LTD., Guangdong (CN)

(72) Inventors: Zehui Huang, Guangdong (CN); Zhongsheng Wang, Guangdong (CN); Jinliang Jiang, Guangdong (CN); Yuqin Yin, Guangdong (CN); Guoyi Hu, Guangdong (CN); Rongcheng Li, Guangdong (CN)

(73) Assignee: FOSHAN DAHAO MEDICAL TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 19/023,552

(22) Filed: Jan. 16, 2025

(30) Foreign Application Priority Data

Dec. 16, 2024 (CN) ......................... 202411859059.6
Dec. 16, 2024 (CN) ......................... 202423113318.9

(51) Int. Cl.
*A61G 5/04* (2013.01)
*A61G 5/08* (2006.01)
*A61G 5/12* (2006.01)

(52) U.S. Cl.
CPC .............. *A61G 5/0883* (2016.11); *A61G 5/04* (2013.01); *A61G 5/0866* (2016.11); *A61G 5/128* (2016.11)

(58) Field of Classification Search
CPC .... A61G 5/0883; A61G 5/128; A61G 5/0866; A61G 5/04

(Continued)

(56) References Cited

U.S. PATENT DOCUMENTS 4,712,830 A 12/1987 Charbrol et al.
6,467,788 B1 * 10/2002 Li ........................ A61G 5/1089
280/649

(Continued)

FOREIGN PATENT DOCUMENTS

WO 2004047707 A2 6/2004
WO 2004047707 A3 6/2004

OTHER PUBLICATIONS

Partial European Search Report received in corresponding European Patent Application No. 25152502.8, dated Jun. 16, 2025, 11 pages.

*Primary Examiner* — James A Shriver, II
*Assistant Examiner* — Hilary L Johns
(74) *Attorney, Agent, or Firm* — Cooper Legal Group, LLC

(57) ABSTRACT

The present application discloses a foldable electric wheelchair. The foldable electric wheelchair includes two frame modules spaced apart; the seat module is provided between two frame modules; the wheel module is located at the bottom of two frame modules; the foot pedal module is located on the front side of two frame modules; a foldable module, wherein the foldable module includes a first folding mechanism, a second folding mechanism, a linkage mechanism, a locking mechanism, and an unlocking mechanism. The first folding mechanism and the second folding mechanism are both provided between two frame modules, and the linkage mechanism is provided between the first folding mechanism and the second folding mechanism. The locking mechanism is slidably provided outside the linkage mechanism, and a support mechanism is hinged between the locking mechanism and the first folding mechanism. The unlocking mechanism slides inside the linkage mechanism.

9 Claims, 13 Drawing Sheets

(58) Field of Classification Search
USPC .......................................................... 180/65.1
See application file for complete search history.

(56) References Cited

U.S. PATENT DOCUMENTS

| | | | | |
|---|---|---|---|---|
| 6,572,133 | B1 | 6/2003 | Stevens | |
| 6,811,178 | B2 * | 11/2004 | Tomasi | B62B 7/086 280/650 |
| 7,338,133 | B2 * | 3/2008 | Laffin | A61G 5/14 297/423.28 |
| 9,375,370 | B2 * | 6/2016 | Horacek | A61G 5/1054 |
| 10,064,769 | B2 * | 9/2018 | Thompson | A61G 5/0816 |
| 10,828,213 | B1 * | 11/2020 | Ludovici | A61G 5/1054 |
| 11,364,163 | B1 * | 6/2022 | Foonberg | A61G 5/0875 |
| 11,877,965 | B2 * | 1/2024 | Mullins | A61G 5/1037 |
| 12,090,099 | B2 * | 9/2024 | Iwase | A61G 5/1056 |
| 2002/0113414 | A1 * | 8/2002 | Tomasi | B62B 7/064 280/648 |
| 2005/0035648 | A1 * | 2/2005 | Laffin | A61G 5/128 297/466 |
| 2007/0273124 | A1 * | 11/2007 | Nishi | A61G 5/0883 280/250.1 |
| 2008/0245592 | A1 * | 10/2008 | Wu | A61G 5/125 180/208 |
| 2009/0079229 | A1 * | 3/2009 | Schmidt | B60P 3/341 296/164 |
| 2016/0058637 | A1 * | 3/2016 | Horacek | A61G 5/1054 280/649 |
| 2017/0290722 | A1 * | 10/2017 | Thompson | A61G 5/0825 |
| 2022/0110818 | A1 * | 4/2022 | Orrell-Jones | A61G 5/0825 |
| 2022/0233374 | A1 * | 7/2022 | Iwase | A61G 5/0816 |
| 2022/0233375 | A1 * | 7/2022 | Mullins | A61H 3/04 |
| 2022/0378633 | A1 * | 12/2022 | Alvarez | A61G 5/128 |
| 2023/0085749 | A1 * | 3/2023 | Li | A61G 5/085 280/650 |

* cited by examiner

FOLDABLE ELECTRIC WHEELCHAIR

CROSS-REFERENCE TO RELATED APPLICATION

The present application is based on and claims the priority benefits of China patent application No. 202411859059.6, filed on Dec. 16, 2024, and China patent application No. 202423113318.9, filed on Dec. 16, 2024. The entireties of China patent application No. 202411859059.6 and China patent application No. 202423113318.9 are hereby incorporated by reference herein and made a part of this specification.

TECHNICAL FIELD

The present application relates to the field of wheelchair technology, and, more particularly, to a foldable electric wheelchair.

BACKGROUND ART

A wheelchair is a chair provided with wheels that can help replace walking. According to the driving method of wheelchairs, they can be divided into manual wheelchairs and electric wheelchairs. Wheelchairs are mainly used to meet the transportation needs of people with physical disabilities and limited mobility, as well as to facilitate the movement of family members and care for patients.

Existing wheelchairs typically include a frame module, a seat module located at the top of the frame module for a user to sit on, a wheel module located at the bottom of the frame module for driving the frame module to move, and a foot pedal module located at the front of the frame module for the user to step on. Among them, the frame module is usually designed as a foldable scissor structure, which allows the frame module to be folded to reduce its volume, making it easier for wheelchair packaging, transportation, and daily carrying.

SUMMARY

In order to reduce the volume of an electric wheelchair and facilitate packaging, transportation, and daily carrying of the electric wheelchair, the present application provides a foldable electric wheelchair.

A foldable electric wheelchair includes two framework modules arranged at intervals; a seat module located between the two frame modules for a user to sit on; a wheel module located at a bottom of the two frame modules and used to drive the frame modules to move; a foot pedal module located on a front side of the two frame modules for a user to step on; and a foldable module, wherein the foldable module comprises a first folding mechanism, a second folding mechanism, a linkage mechanism, a locking mechanism, and an unlocking mechanism; the first folding mechanism and the second folding mechanism are both provided between the two frame modules, and the linkage mechanism is provided between the first folding mechanism and the second folding mechanism to synchronously unfold or fold the first folding mechanism and the second folding mechanism; the locking mechanism is slidably provided outside the linkage mechanism, and a support mechanism is hinged between the locking mechanism and the first folding mechanism; when the locking mechanism slides to a predetermined position of the linkage mechanism, the locking mechanism and the linkage mechanism interlock with each other, so that the locking mechanism keeps the first folding mechanism in an unfolded state via the support mechanism, and the unlocking mechanism is slidably provided inside the linkage mechanism to release locking between the locking mechanism and the linkage mechanism.

Optionally, each of the first folding mechanism and the second folding mechanism comprises two folding plates and a connecting plate, two sides of the two folding plates away from each other are hinged to the two frame modules, respectively, two sides of the connecting plate are hinged to two sides of the two folding plates adjacent to each other, and two ends of the linkage mechanism are fixed to the connecting plate of the first folding mechanism and the connecting plate of the second folding mechanism.

Optionally, a first hinge shaft is respectively provided on two sides of the connecting plate and between the two folding plates, a second hinge shaft is respectively provided between two sides of the locking mechanism and the two support mechanisms, a hinge part is provided on a side of the connecting plate of the first folding mechanism facing the link mechanism, and a third hinge shaft is respectively provided between the two hinge parts and the two support mechanisms; and, when the first folding mechanism and the second folding mechanism are synchronously folded to the maximum extent, the first hinge shaft, the second hinge shaft and the third hinge shaft are arranged coplanar.

Optionally, an installation cavity is provided in a middle of the frame module, a battery circuit module is provided inside the installation cavity, a protective cover plate is provided at a position corresponding to the installation cavity of the frame module, a control module is provided at a top of the frame module, and the control module, the battery circuit module, as well as the battery circuit module and the wheel module, are all electrically connected through preset wires arranged inside the frame module.

Optionally, the foot pedal module includes an installation frame and a foot pedal, a rotating seat is provided at a front side of the installation frame, one end of the installation frame is rotatably provided on the rotating seat, and the foot pedal is provided at an end of the installation frame away from the installation portion for a user to step on.

Optionally, the locking mechanism comprises a sliding seat, a movable pin, and a second elastic member, wherein the sliding seat is slidably arranged outside the linkage mechanism, the movable pin is slidably arranged inside the sliding seat, and the second elastic member is arranged between the sliding seat and the movable pin for sliding the movable pin into contact with an outside of the linkage mechanism, the linkage mechanism is provided with a locking hole for inserting the movable pin, and when sliding to a predetermined position of the linkage mechanism, the movable pin is inserted into the locking hole; the unlocking mechanism comprises an unlocking push rod, an unlocking head, and a handle assembly; the unlocking push rod is slidably arranged inside the linkage mechanism, the unlocking head is arranged at one end of the unlocking push rod, and the unlocking head is provided with a bevel wedge surface; the handle assembly is arranged at an end of the unlocking push rod away from the unlocking head, and is used to push the unlocking push rod to slide, thereby pushing the movable pin out of the locking hole via the bevel wedge surface.

Optionally, the handle assembly comprises an unlocking handle, an alignment push rod, a third elastic member, and a fourth elastic member, the unlocking handle is slidably arranged at one end of the linkage mechanism away from the first folding mechanism, the alignment push rod is fixedly arranged at one end of the unlocking push rod away from the unlocking head, the unlocking handle is provided with a rotating groove adapted to the rotation of the alignment push rod, and a bottom of the rotating groove is provided with a rotating groove adapted to the rotation of the alignment push rod, a receiving slot is defined at a bottom of the rotating groove adapted to the rotation of the alignment push rod, the third elastic member is provided between the unlocking handle and the linkage mechanism to push the unlocking handle to slide in a direction away from the alignment push rod, so that the alignment push rod is located in the rotating groove, the fourth elastic member is arranged between the unlocking handle and the linkage mechanism to drive the unlocking handle to rotate around an axis of the linkage mechanism, so as to align the alignment push rod and the receiving slot with each other.

Optionally, the fourth elastic member comprises a resetting ring, a resetting slider, and a resetting spring, wherein the resetting ring is slidably arranged on an outer circumference of the unlocking handle, and an inner circumference of the resetting ring is provided with sliding teeth that mesh with the outer circumference of the unlocking handle, so that the unlocking handle has a degree of freedom to slide in the direction away from the alignment push rod, the resetting slider is fixedly arranged on the outer circumference of the resetting ring, and the inner circumference of the linkage mechanism is provided with sliding teeth that mesh with the outer circumference of the unlocking handle, the resetting groove of the linkage mechanism is arranged axially, and the resetting slider is slidably provided on the resetting groove, and the resetting spring is provided between the resetting groove and the resetting slider to drive the resetting ring to rotate around an axis of the linkage mechanism.

Optionally, an anti-loosening mechanism is provided between the fourth elastic member and the locking mechanism, the anti-loosening mechanism comprises a fixed tube, a sliding rod, and an anti-loosening ring, the fixed tube extends axially along the linkage mechanism, and the fixed tube is fixedly provided inside the linkage mechanism, the sliding rod is slidably provided inside the fixed tube, the anti-loosening ring is fixedly provided at one end of the sliding rod, a sliding ball is provided at one end of the sliding rod away from the anti-loosening ring, the resetting ring is provided with a pushing groove arranged along an axial direction of the linkage mechanism, the sliding ball is slidably provided on the pushing groove, and the resetting ring is rotated around the linkage mechanism, so that the sliding ball drives the anti-loosening ring to abut against the movable pin through the sliding rod when the alignment push rod and the receiving slot are aligned with each other.

Optionally, there are two anti-loosening mechanisms and two locking mechanisms, and the two anti-loosening mechanisms and the two locking mechanisms are arranged misaligned from each other along an axial direction of the linkage mechanism.

In summary, the present application can achieve at least one beneficial technical effect as follows.

When it is necessary to package and transport/carry an electric wheelchair on a daily basis, the handle assembly pushes the unlocking head to slide by unlocking the push rod, and uses the bevel wedge surface of the unlocking head to push the movable pin out of the locking hole, thereby releasing the locking relationship between the locking mechanism and the linkage mechanism. This allows the first folding mechanism and the second folding mechanism to fold and contract, thereby bringing the two sets of frame modules closer to each other for compression, and the seat module to fold and contract, so as to reduce the volume of the electric wheelchair and facilitate packaging, transportation, and daily carrying.

DETAILED DESCRIPTION

The present application will be further described in detail with reference to FIGS. 1 to 12.

Embodiment 1

Figure 1:
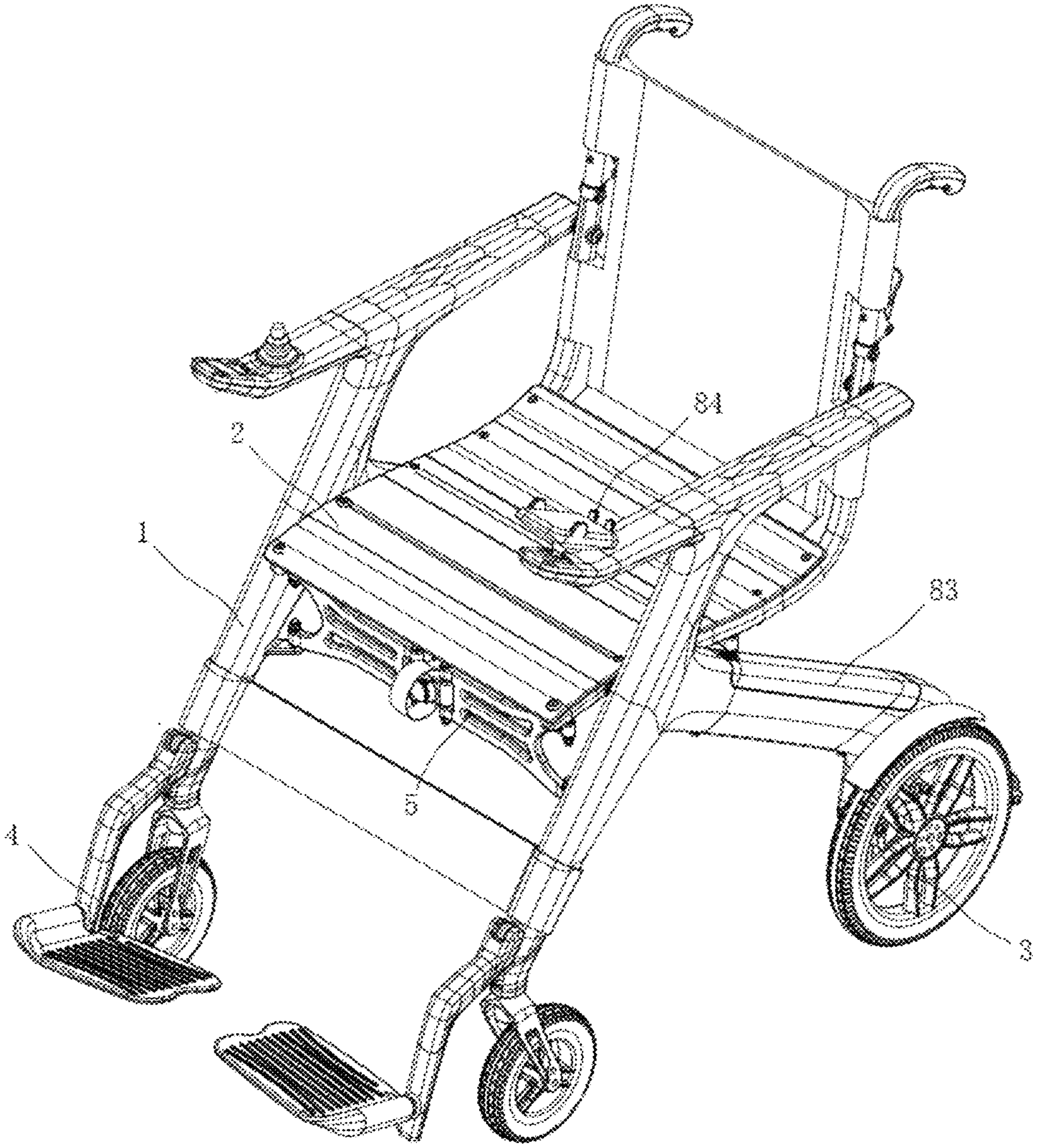
FIG. 1 is a perspective view of an overall structure of Embodiment 1 of the present application.
Figure 2:
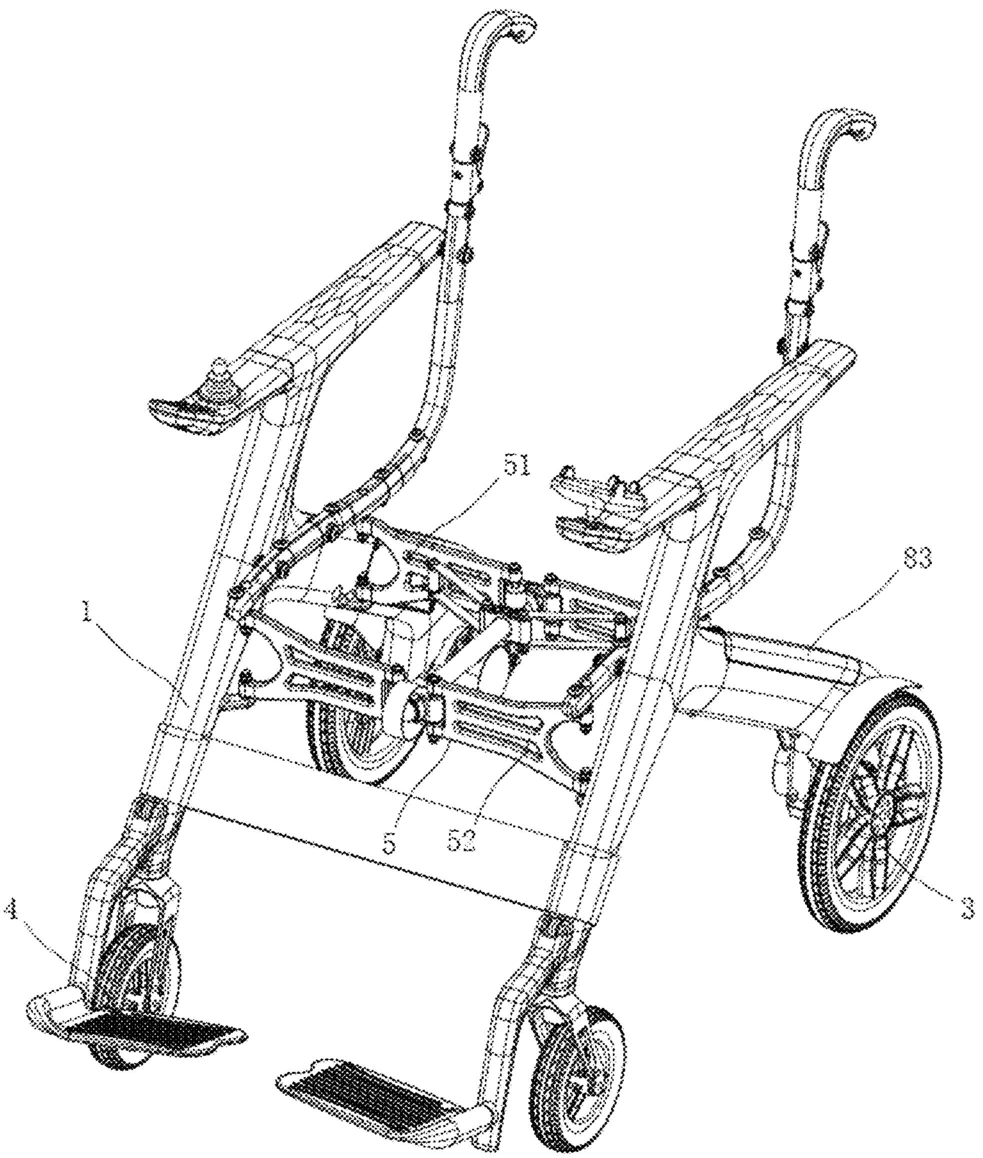
FIG. 2 is a schematic diagram of a position of a foldable module in Embodiment 1 of the present application.
Figure 3:
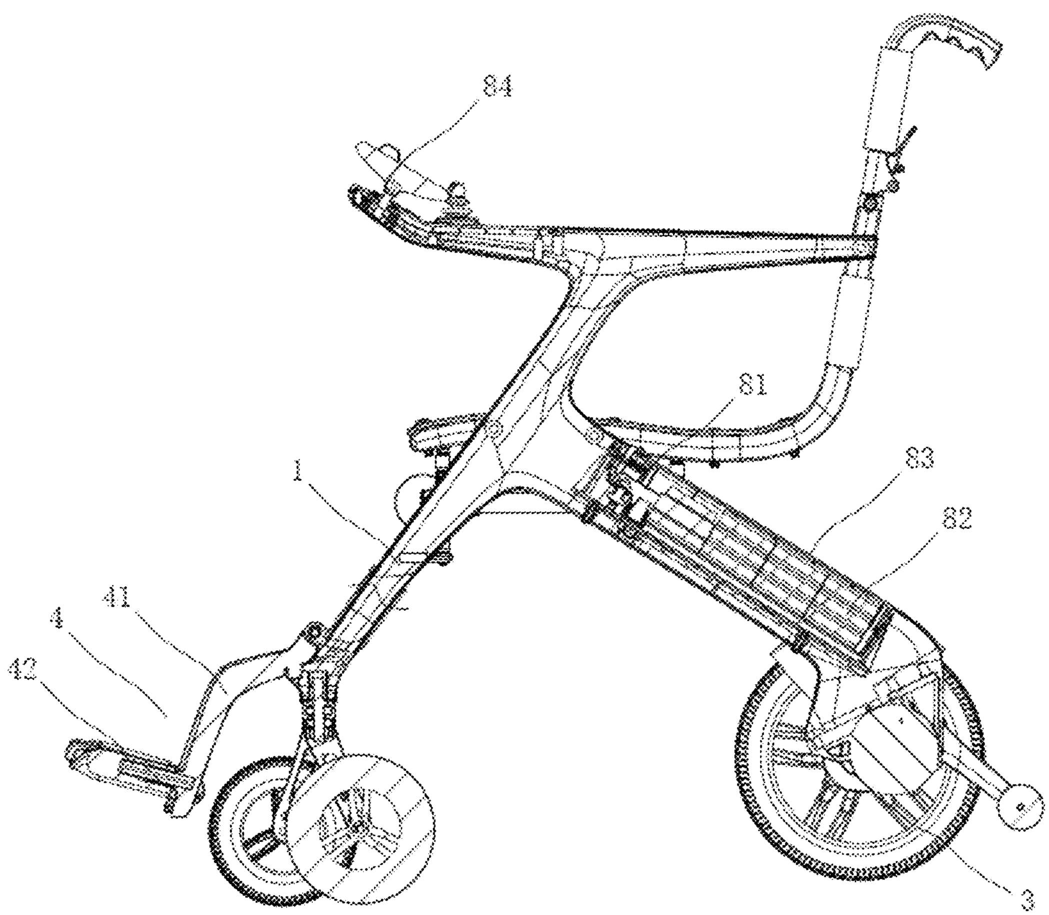
FIG. 3 is a structural diagram of a framework module in Embodiment 1 of the present application.
Figure 4:
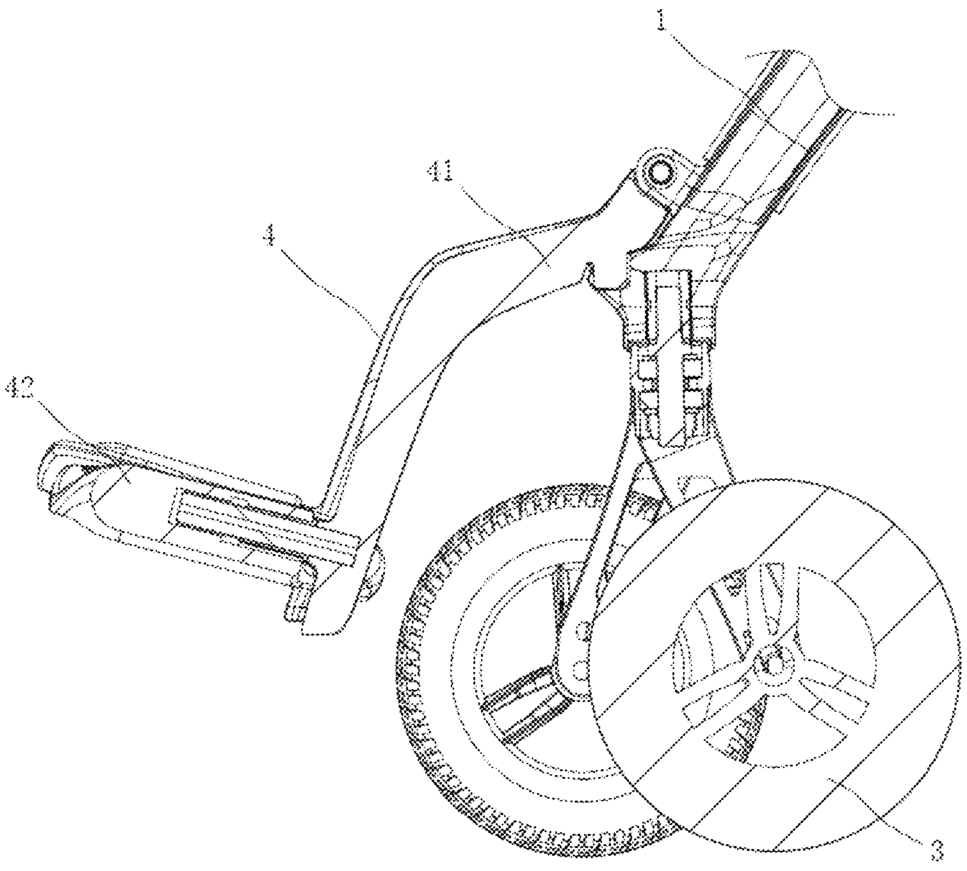
FIG. 4 is a cross-sectional view of a foot pedal module in Embodiment 1 of the present application.
Figure 5:
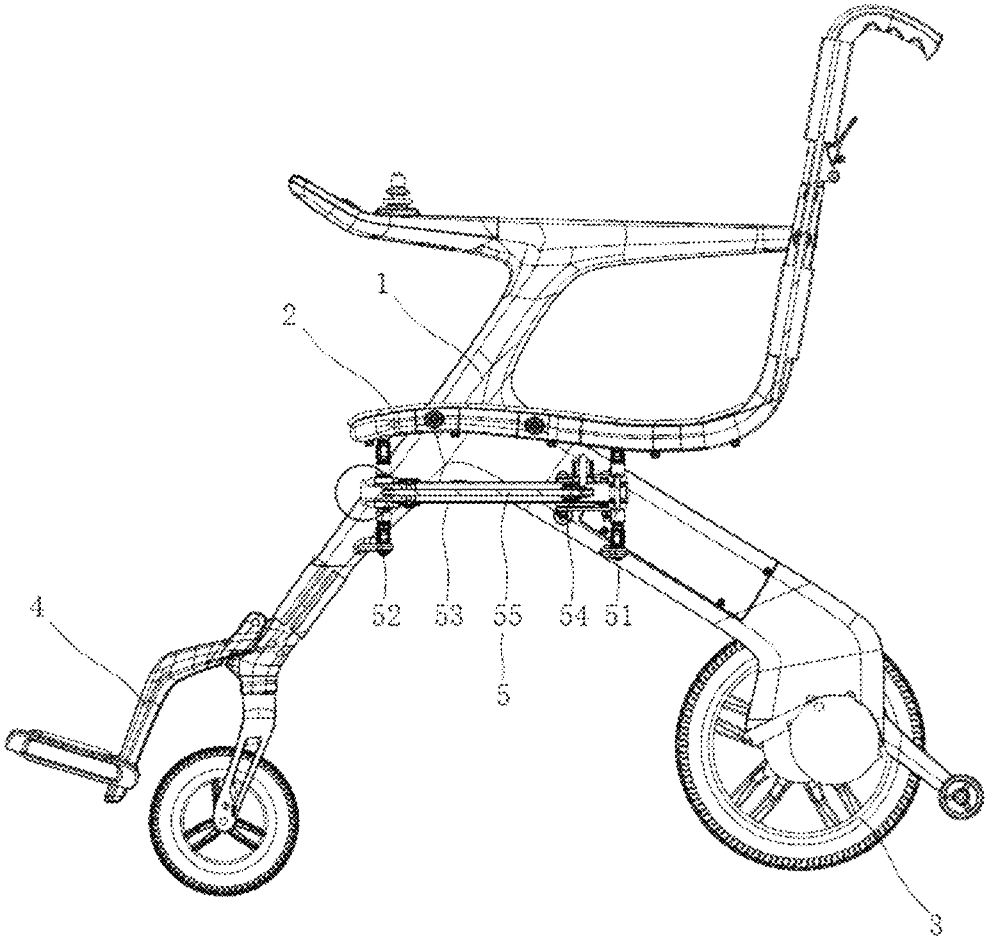
FIG. 5 is a sectional view of an overall structure of Embodiment 1 of the present application.
Figure 6:
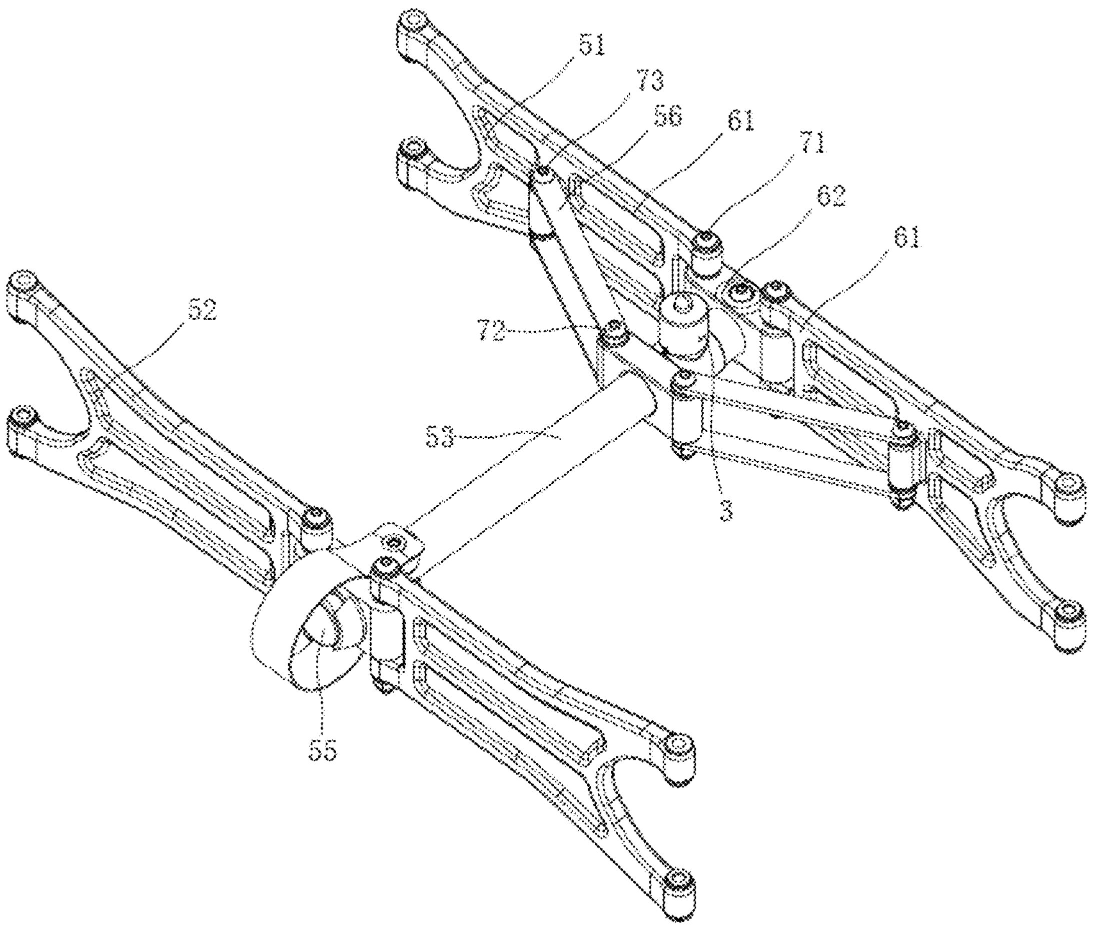
FIG. 6 is a perspective view of a foldable module in the unfolded state in Embodiment 1 of the present application.
Figure 7:
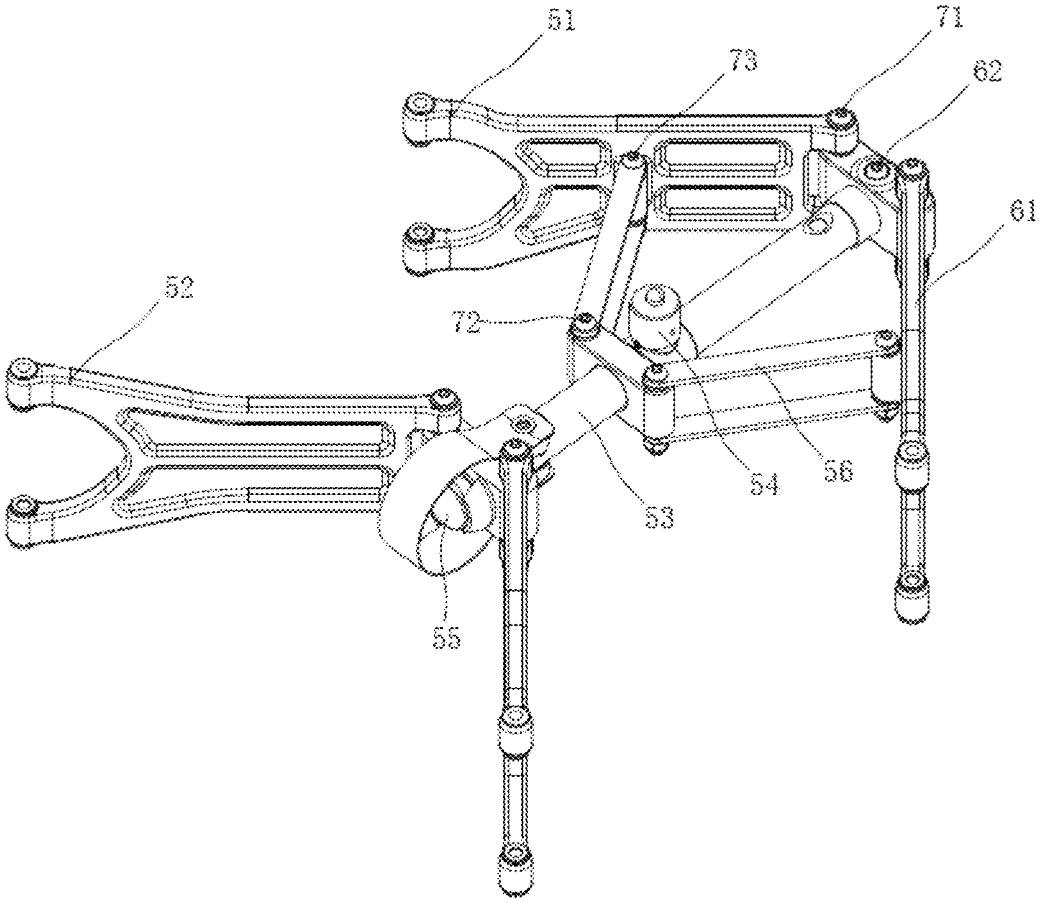
FIG. 7 is a perspective view of a foldable module during a folding process in Embodiment 1 of the present application.
Figure 8:
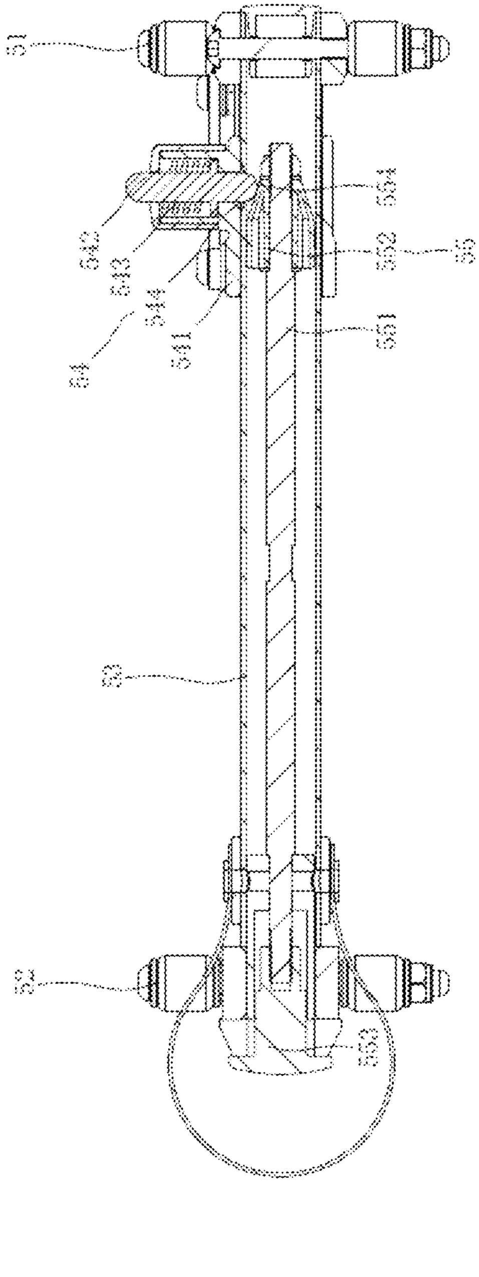
FIG. 8 is a sectional view of a foldable module in Embodiment 1 of the present application.
Figure 9:
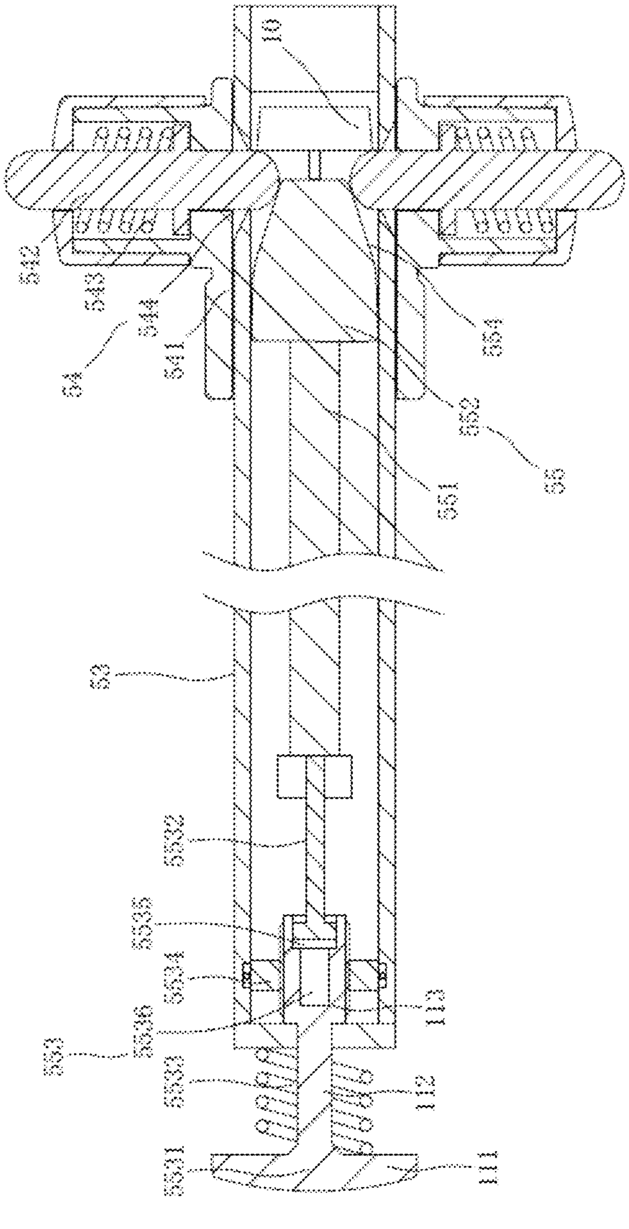
FIG. 9 is a vertical sectional view of a foldable module in Embodiment 2 of the present application.
Figure 10:
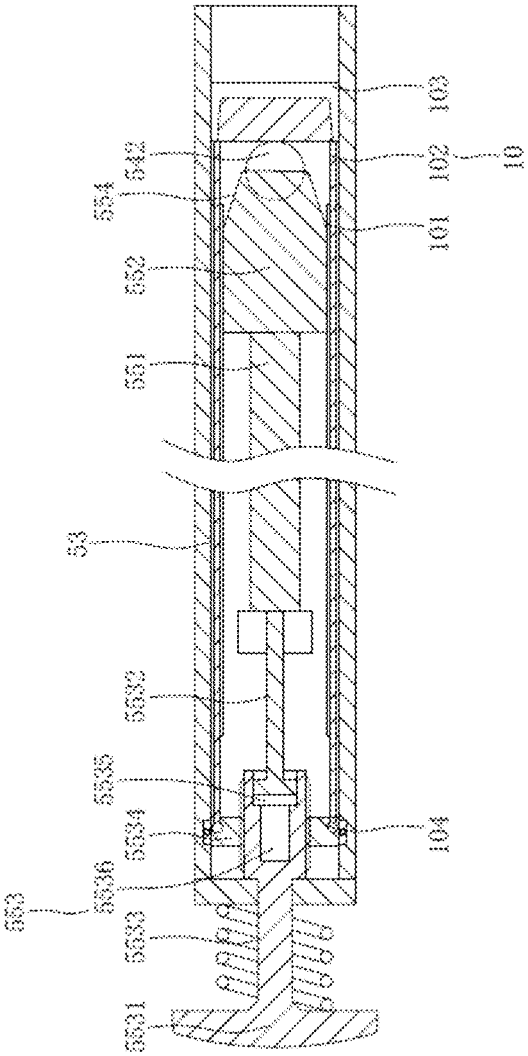
FIG. 10 is a horizontal sectional view of a foldable module in Embodiment 2 of the present application.
Figure 11:
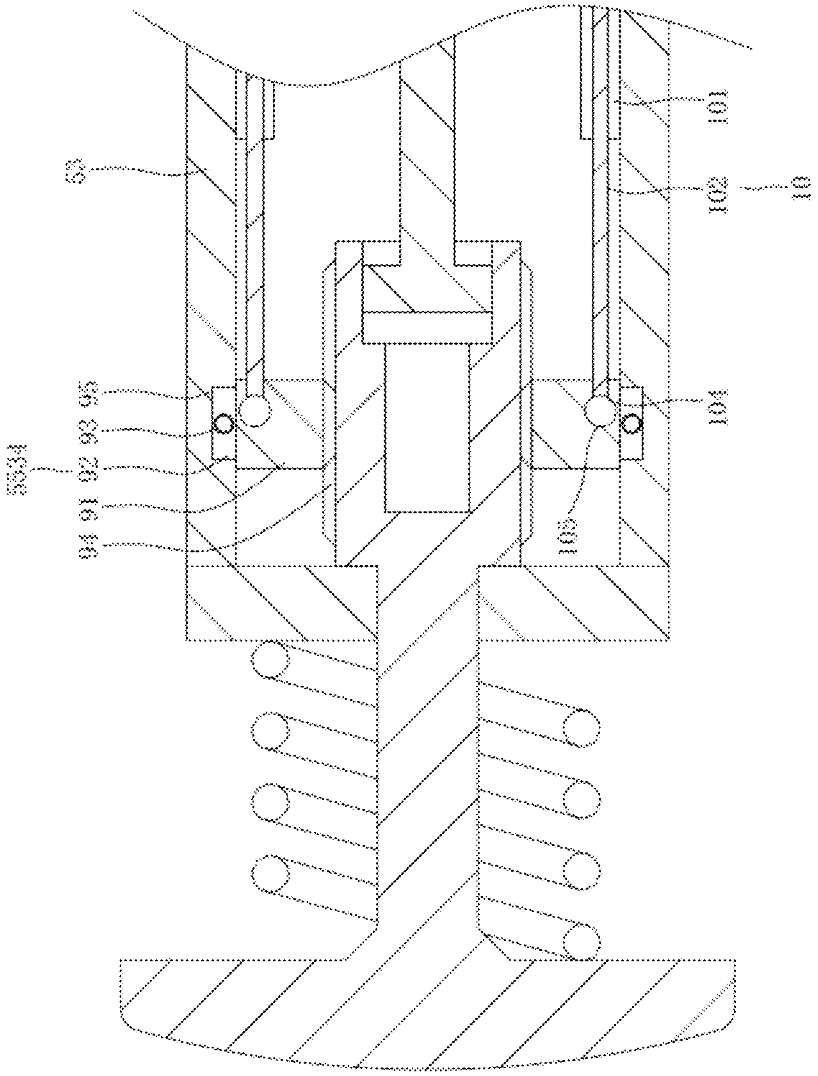
FIG. 11 is a vertical sectional view of a fourth elastic member in Embodiment 2 of the present application.
Figure 12:
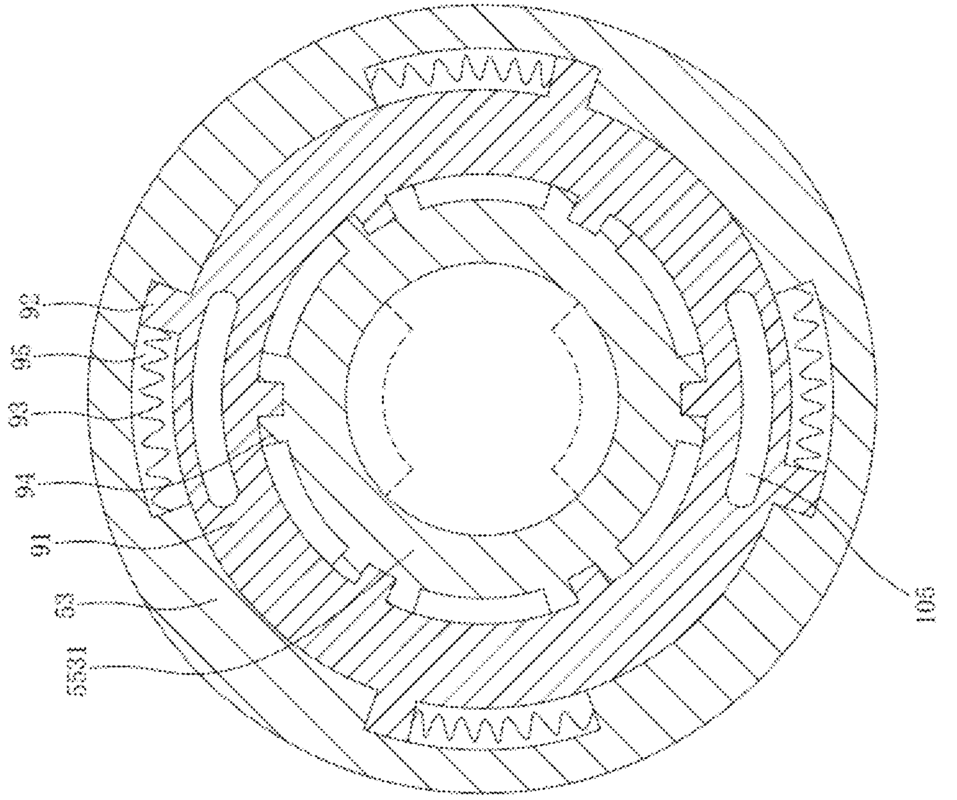
FIG. 12 is a transverse sectional view of a fourth elastic member in Embodiment 2 of the present application.
Figure 13:
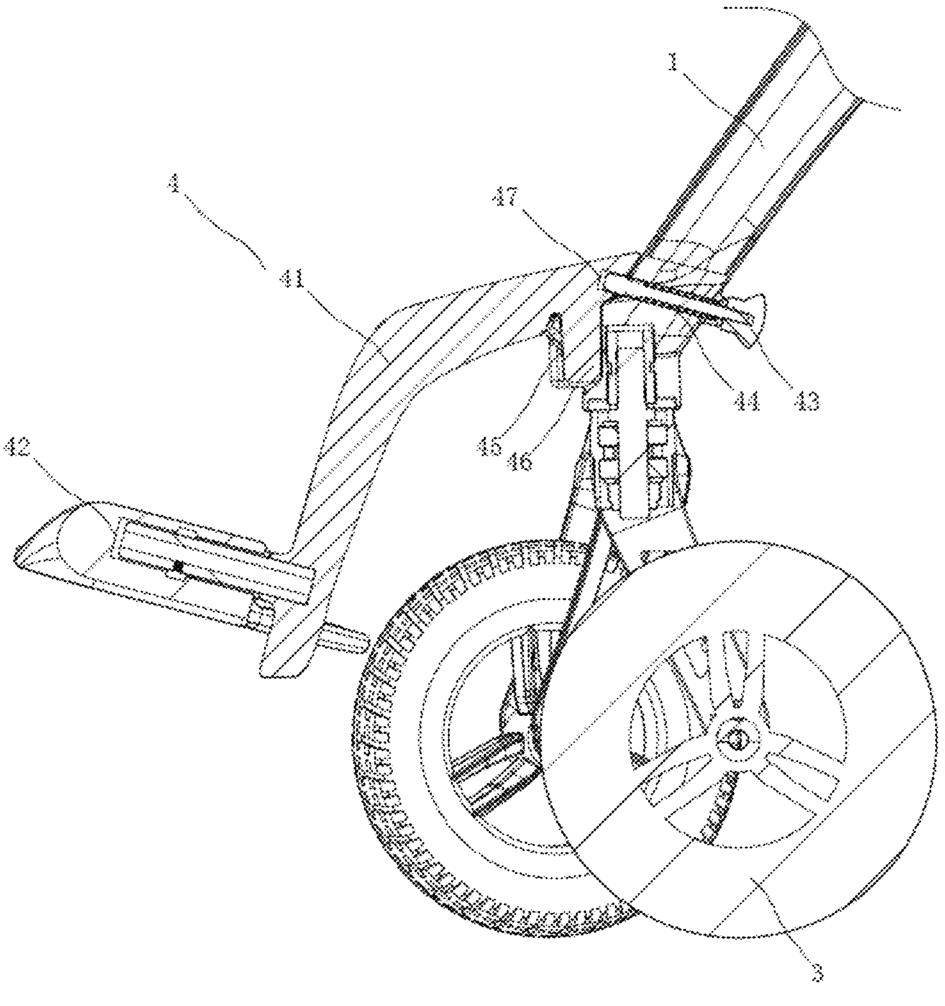
FIG. 13 is a sectional view of a foot pedal module in Embodiment 3 of the present application.

Referring to FIGS. 1-3, a foldable electric wheelchair includes a frame module 1, a seat module 2, a wheel module 3, a foot pedal module 4, and a foldable module 5. There are two sets of frame modules 1, which are symmetrically spaced apart. The two sets of frame modules 1 are respectively made of carbon fiber material, thus possessing lightweight and high-strength performance. The seat module 2 is fixedly installed between two sets of frame modules 1, and the seat module 2 is made of foldable fabric, which not only allows users to sit on it, but also enables folding and storage. The wheel module 3 is fixedly installed at the bottom of two sets of frame modules 1, and adopts electric wheel mode. A user can control the wheel module 3 to drive the frame module 1 and the electric wheelchair to move as a whole. The foot pedal module 4 is detachably fixed on the front side of the two sets of frame modules 1, allowing the foot pedal module 4 to be installed according to the actual needs of the user for stepping on. The foldable module 5 is provided between two sets of frame modules 1, which can be unfolded and folded. Therefore, it can not only drive the two sets of frame modules 1 to unfold each other for use, but also drive the two sets of frame modules 1 to condense each other to reduce the overall volume of the electric wheelchair, thereby facilitating the packaging, transportation, and daily carrying of the electric wheelchair as a whole.

The wheel module 3 includes two electric wheels and two ordinary wheels, both of which are disclosed in the prior art and will not be repeated here. Two electric wheels are respectively fixed on the rear side of two sets of frame modules 1, and two ordinary wheels are respectively fixed on the front side of two frame modules 1, so that the wheel module 3 can drive the frame module 1 and the electric wheelchair to move as a whole. In addition, there is an installation cavity 81 in the middle of the frame module 1, and a battery circuit module 82 is installed inside the installation cavity 81. Frame module 1 is provided with a protective cover plate 83 at the corresponding position of the installation cavity 81. The frame module 1 is provided with a control module 84 at the top thereof. The battery circuit module 82 and the control module are both existing technologies and will not be further elaborated here. The control module 84 and the battery circuit module 82, as well as the battery circuit module 82 and the wheel module 3, are all electrically connected through pre-set wires, which are provided inside the frame module 1. A user inputs commands through the control module 84, and the battery circuit module 82 receives the commands and controls the wheel module 3 to perform corresponding actions. This enables the wheel module 3 to drive the frame module 1 and the electric wheelchair as a whole to achieve forward, backward, and turning movements. The wires are distributed inside the one-piece frame module 1, which is beneficial for protecting the wires and minimizing damage during the folding process of the electric wheelchair.

In this embodiment, the foot pedal module 4 includes a installation frame 41 and a foot pedal 42. In particular, the installation frame 41 is a curved rod structure made of carbon fiber material. A rotating seat is fixedly provided on the front side of the frame module 1. One end of the installation frame 41 is provided on the rotating seat through a preset rotating pin. The foot pedal 42 is composed of an installation shaft and a pedal that rotates on the installation shaft. The installation shaft of the foot pedal 42 is fixedly provided on the end of the installation frame 41 away from the rotating seat, so that the pedal of the foot pedal 42 is used for users to step on. The foot pedal module 4 can rotate and fold relative to the frame module 1, further reducing the overall volume of the electric wheelchair.

The foldable module 5 includes a first folding mechanism 51, a second folding mechanism 52, a linkage mechanism 53, a locking mechanism 54, and an unlocking mechanism 55. The overall structure of the first folding mechanism 51 and the second folding mechanism 52 is the same. They are provided between two frame modules 1 and arranged at intervals, and both have the functions of unfolding and folding. Specifically, both the first folding mechanism 51 and the second folding mechanism 52 include two folding plates 61 and a connecting plate 62. The two folding plates 61 are symmetrically spaced apart and are hinged to two frame modules 1 on the side away from each other. The connecting plate 62 is hinged to sides of the two folding plates 61 closer to each other. By controlling the synchronous unfolding or folding of the two folding plates 61 relative to the connecting plate 62, the folding function of the first folding mechanism 51 and the second folding mechanism 52 can be achieved.

The linkage mechanism 53 is a metal circular tube, and its two ends are vertically fixed to the connecting plate 62 of the first folding mechanism 51 and the connecting plate 62 of the second folding mechanism 52, so that during the synchronous movement of the linkage mechanism 53 with the two connecting plates 62, the two folding plates 61 of the first folding mechanism 51 and the two folding plates 61 of the second folding mechanism 52 are synchronously unfolded or folded, thereby achieving synchronous unfolding or folding of the first folding mechanism 51 and the second folding mechanism 52.

The locking mechanism 54 slidably provided outside the linkage mechanism 53, and a support mechanism 56 is hinged between the locking mechanism 54 and the first folding mechanism 51. When the locking mechanism 54 slides to a predetermined position of the linkage mechanism 53, the locking mechanism 54 and the linkage mechanism 53 lock with each other, so that the locking mechanism 54 pushes the first folding mechanism 51 to maintain the unfolded state through the support mechanism 56. Specifically, the locking mechanism 54 includes a sliding seat 541, a movable pin 542, and a second elastic member 543. The sliding seat 541 is installed outside the linkage mechanism 53, and the support mechanism 56 is a metal support rod. There are two support mechanisms 56. One end of the two support mechanisms 56 is hinged to both sides of the sliding seat 541, while the other end is hinged to the two folding plates 61 of the first folding mechanism 51. The sliding seat 541 is provided with a spring chamber inside, and the movable pin 542 slides through the spring chamber inside the sliding seat 541. The second elastic member 543 is designed as a compression spring, and is located in the spring chamber inside the sliding seat 541. The second elastic member 543 is in contact with the movable pin 542 to push the movable pin 542 to slide and come into contact with the outside of the linkage mechanism 53. The linkage mechanism 53 is provided with a locking hole 544 for mutual insertion connection with the movable pin 542, and when the sliding seat 541 slides to the predetermined position of the linkage mechanism 53, the movable pin 542 is inserted into the locking hole 544. When the sliding seat 541 slides to the predetermined position of the linkage mechanism 53, the sliding seat 541 is locked by the insertion of the movable pin 542 and the locking hole 544. At this time, the sliding seat 541 unfolds the two folding plates 61 of the first folding mechanism 51 through the support mechanism 56, thereby forming a stable triangular structure of the first folding mechanism 51, the support mechanism 56, and the linkage mechanism 53. The locking mechanism 54 thus maintains the unfolded state of the first folding mechanism 51 through the support mechanism 56.

The unlocking mechanism 55 is slidably provided inside the linkage mechanism 53, used to release the locking between the locking mechanism 54 and the linkage mechanism 53, so as to restore the degree of freedom of the locking mechanism 54 to slide relative to the linkage mechanism 53. The unlocking mechanism 55 specifically includes an unlocking push rod 551, an unlocking head 552, and a handle assembly 553. The unlocking push rod 551 is slidably provided inside the linkage mechanism 53 through a preset sliding support. The unlocking head 552 is fixedly provided at one end of the unlocking push rod 551 near the locking hole 544, and is provided with a bevel wedge surface 554. The bevel wedge surface 554 can push the movable pin 542 to overcome the elastic force of the second elastic member 543 and slide, thereby pushing the movable pin 542 out of the locking hole 544. The handle assembly 553 is provided at one end of the unlocking push rod 551 away from the unlocking head 552, used to push the unlocking push rod 551 to slide relative to the linkage mechanism 53. During the process of sliding the unlocking head 552 through the unlocking push rod 551 in the handle assembly 553, the bevel wedge surface 554 of the unlocking head 552 pushes the movable pin 542 out of the locking hole 544, thereby releasing the insertion connection between the locking mechanism 54 and the linkage mechanism 53, allowing the first folding mechanism 51 and the second folding mechanism 52 to fold and condense.

Implementation Principle

For using the electric wheelchair, the sliding seat 541 is manually pushed to slide on the linkage mechanism 53 towards the first folding mechanism 51. When the sliding seat 541 slides to the predetermined position of the linkage mechanism 53, the movable pin 542 aligns with the locking hole 544, and the movable pin 542 is pushed into the locking hole 544 by the second elastic member 543. At this time, the sliding seat 541 forms a supporting and unfolding effect on the two folding plates 61 of the first folding mechanism 51 through the support mechanism 56, so that the first folding mechanism 51, the support mechanism 56, and the linkage mechanism 53 form a stable triangular structure. The locking mechanism 54 thus maintains the unfolded state of the first folding mechanism 51 through the support mechanism 56, and synchronously, the linkage mechanism 53 pushes the second folding mechanism 52 in the opposite direction to maintain its unfolded state, thereby keeping the two frames module 1 and seat module 2 at unfolded state for the user to sit.

In this embodiment, first hinge shafts 71 are respectively provided on both sides of the connecting plate 62 and between the two folding plates 61, and second hinge shafts 72 are respectively provided on both sides of the locking mechanism 54 and between the two support mechanisms 56. The connecting plate 62 of the first folding mechanism 51 is fixedly provided with a protruding hinge part facing the linkage mechanism 53, and third hinge shafts 73 are respectively provided between the two hinge parts and the two support mechanisms 56. The distance between the first hinge shaft 71 and the linkage mechanism 53, the distance between the second hinge shaft 72 and the linkage mechanism 53, and the distance between the third hinge shaft 73 and the top of the hinge part are equal, so that when the first folding mechanism 51 and the second folding mechanism 52 are synchronously condensed to the maximum extent, the first hinge shaft 71, the second hinge shaft 72, and the third hinge shaft 73 are arranged coplanar.

Embodiment 2

The difference between Embodiment 1 and Embodiment 2 is that in Embodiment 1, simply pushing the handle assembly 553 can make the unlocking head 552 slide, achieving a simple unlocking process. However, in Embodiment 2, the handle assembly 553 needs to be rotated a certain angle before the unlocking head 552 can be unlocked by sliding the unlocking push rod 551, thus avoiding the insertion connection between the locking mechanism 54 and the linkage mechanism 53 due to accidental contact with the handle assembly 553. The two embodiments have their own advantages The handle assembly 553 includes an unlocking handle 5531, an alignment push rod 5532, a third elastic member 5533, and a fourth elastic member 5534. The unlocking handle 5531 includes a handle part 111, a sliding rod part 112, and a linkage part 113 connected in sequence. The sliding rod part 112 of the unlocking handle 5531 slides through the end of the linkage mechanism 53, giving the unlocking handle 5531 the freedom to rotate and slide around the axis of the linkage mechanism 53. The alignment push rod 5532 is approximately a T-shaped structure, and the tail of the alignment push rod 5532 is fixedly provided at the end of the unlocking push rod 551 away from the unlocking head 552. The linkage part 113 of the unlocking handle 5531 is provided with a rotating groove 5535 that is compatible with the head rotation of the alignment push rod 5532, allowing the head of the alignment push rod 5532 to freely rotate within the rotating groove 5535. The bottom of the rotating groove 5535 is provided with an receiving slot 5536 that is adapted to slide with the head of the alignment push rod 5532. As the unlocking handle 5531 rotates to align the receiving slot 5536 with the head of the alignment push rod 5532, the unlocking handle 5531 and the alignment push rod 5532 slide relative to each other, and the unlocking handle 5531 cannot push the alignment push rod 5532. However, as the unlocking handle 5531 rotates to misaligned with the head of the receiving slot 5536 and the alignment push rod 5532, the unlocking handle 5531 and the alignment push rod 5532 slide synchronously, and the unlocking handle 5531 can push the alignment push rod 5532. The third elastic member 5533 adopts a compression spring, which is provided between the unlocking handle 5531 and the linkage mechanism 53. The third elastic member 5533 is used to slide the unlocking handle 5531 in the direction away from the alignment push rod 5532, so that the head of the alignment push rod 5532 slides inside the rotating groove 5535. The fourth elastic member 5534 is approximately a torsion spring as a whole. It is provided between the linkage part 113 of the unlocking handle 5531 and the linkage mechanism 53, and is used to drive the unlocking handle 5531 to rotate around the axis of the linkage mechanism 53, so as to align the alignment push rod 5532 and the receiving slot 5536 with each other.

The fourth elastic member 5534 includes a resetting ring 91, a resetting slider 92, and a resetting spring 93. The inner circumference of the resetting ring 91 is slidably provided on the outer circumference of the linkage part 113 of the unlocking handle 5531, and the inner circumference of the resetting ring 91 is provided with sliding teeth 94 that mesh with the outer circumference of the linkage part 113 of the unlocking handle 5531, so that the unlocking handle 5531 has a freedom to slide in the direction away from the alignment push rod 5532. At the same time, the linkage part 113 of the unlocking handle 5531 can also drive the resetting ring 91 to rotate. The resetting slider 92 is fixedly provided on the outer circumference of the resetting ring 91, and a resetting groove 95 arranged along an axial direction of the linkage mechanism 53 is provided on the inner circumference of the linkage mechanism 53. The resetting slider 92 slides on the resetting groove 95. The resetting spring 93 adopts a compression spring, which is fixedly provided between the resetting groove 95 and the resetting slider 92 and used to drive the resetting ring 91 to rotate around the axis of the linkage mechanism 53.

When using the handle assembly 553, the unlocking push rod 551, and the unlocking head 552 to push the movable pin 542 out of the locking hole 544, the unlocking handle 5531 is firstly rotated by 90 degrees to make the receiving slot 5536 rotate to be misaligned from the head of the alignment push rod 5532, and then push the unlocking handle 5531. Due to the abutting relationship between the unlocking handle 5531 and the alignment push rod 5532, the unlocking handle 5531 pushes the alignment push rod 5532 to slide synchronously, causing the unlocking push rod 551 to push the unlocking head 552 to slide, and then the bevel wedge surface 554 of the unlocking head 552 is used to push the movable pin 542 out of the locking hole 544, thereby releasing the insertion connection between the locking mechanism 54 and the linkage mechanism 53. On the contrary, if the unlocking handle 5531 is directly pushed, the receiving slot 5536 of the unlocking handle 5531 will align with the head of the alignment push rod 5532. The unlocking handle 5531 will slide relative to the alignment push rod 5532, and the unlocking handle 5531 will not be able to push the alignment push rod 5532. By first rotating and then pushing the unlocking handle 5531, it is possible to effectively avoid the situation where children or users accidentally touch the unlocking handle 5531, causing the insertion connection between the locking mechanism 54 and the linkage mechanism 53 to be released.

In this embodiment, an anti-loosening mechanism 10 is provided between the fourth elastic member 5534 and the locking mechanism 54. The anti-loosening mechanism 10 can assist in contacting the movable pin 542 when the foldable module 5 is unfolded, so that even if the elastic force of the second elastic member 543 fails, it can assist in stably inserting the movable pin 542 into the locking hole 544.

The anti-loosening mechanism 10 specifically includes a fixed tube 101, a sliding rod 102, and an anti-loosening ring 103. The fixed tube 101 extends axially along the linkage mechanism 53, and is fixedly provided on the inner circumference of the linkage mechanism 53. The sliding rod 102 slides through the fixed tube 101, and one end of the sliding rod 102 extends to the side of the movable pin 542 away from the unlocking head 552. The anti-loosening ring 103 adopts a rubber ring structure, and is also located on the side of the movable pin 542 away from the unlocking head 552 and fixedly provided on the sliding rod 102. A sliding ball 104 is provided at one end of the sliding rod 102 away from the anti-loosening ring 103, and a diameter of the sliding ball 104 is larger than that of the sliding rod 102. The resetting ring 91 is provided with a pushing groove 105 distributed along the axis of the linkage mechanism 53. The bottom of the pushing groove 105 is a lifting wedge surface, and the sliding ball 104 is slidably provided on the pushing groove 105. When the resetting ring 91 rotates around the axis of the linkage mechanism 53 to align the alignment push rod 5532 and the receiving slot 5536 with each other, the sliding ball 104 drives the anti-loosening ring 103 to contact the movable pin 542 through the sliding rod 102.

When there is no other external force acting on the folding mechanism, the third elastic member 5533 pushes the unlocking handle 5531 to slide and reset in the direction away from the alignment push rod 5532, and the fourth elastic member 5534 drives the unlocking handle 5531 to rotate and reset around the axis of the linkage mechanism 53. As the resetting ring 91 rotates, the sliding ball 104 slides along the lifting wedge surface at the bottom of the pushing groove 105, and the anti-loosening ring 103 is driven by the sliding rod 102 to move to the locking hole 544 position. As the folding mechanism unfolds and the movable pin 542 is inserted into the locking hole 544 under the elastic force of the second elastic member 543, the anti-loosening ring 103 comes into contact with the movable pin 542 on the side away from the unlocking head 552, allowing the anti-loosening ring 103 to assist in contacting the movable pin 542 in the unfolded state of the foldable module 5, and cooperating with the second elastic member 543 to improve the locking stability of the movable pin 542 in the locking hole 544.

When using the handle assembly 553, unlocking push rod 551, and unlocking head 552 to push the movable pin 542 out of the locking hole 544, the unlocking handle 5531 is firstly rotated to drive the resetting ring 91 to rotate, so that the sliding ball 104 slides along the lifting wedge surface at the bottom of the pushing groove 105, and then the anti-loosening ring 103 is pushed through the sliding rod 102 to move away from the movable pin 542. At this time, pushing the unlocking handle 5531 can release the insertion connection between the locking mechanism 54 and the linkage mechanism 53.

In this embodiment, there are two anti-loosening mechanisms 10 and two locking mechanisms 54 configured, and the two anti-loosening mechanisms 10 and the two locking mechanisms 54 are arranged misaligned from each other along the axial direction of the linkage mechanism 53. By increasing the number of anti-loosening mechanisms 10 and locking mechanisms 54, the structural reliability can be improved.

Embodiment 3

The difference between Embodiment 3 and Embodiment 1 is that the foot pedal module 4 of Embodiment 1 adopts a rotating/folding method to reduce the overall volume of the electric wheelchair, while the foot pedal module 4 of Embodiment 3 adopts a detachable method to reduce the overall volume of the electric wheelchair, both of which have their own advantages.

In this embodiment, the foot pedal module 4 includes a installation frame 41, a foot pedal 42, a locking pin 43, and a first elastic member 44. The front side of frame module 1 is equipped with an installation groove 45 with an opening inclined upwards. The installation frame 41 is a curved rod structure made of carbon fiber material, and the top of the installation frame 41 is integrally formed with an installation part 46 that is inserted into the installation groove 45. The foot pedal 42 is fixedly installed at one end of the installation frame 41 away from the installation part 46 and is used for the user to step on. The locking pin 43 slides through frame module 1. The first elastic member 44 is designed as a compression spring, which is fixed between the frame module 1 and the locking pin 43, and is used to push the locking pin 43 to slide into contact with the installation frame 41. The installation frame 41 is provided with a locking slot 47 for accommodating the locking pin 43. When the installation part 46 is fully inserted into the installation groove 45, the locking pin 43 is inserted into the locking slot 47, so as to use the locking pin 43 to detachably lock the installation frame 41, allowing the foot pedal module 4 to be installed on the front side of the frame module 1 according to the user's actual needs for the user to step on.

The embodiments of this specific implementation are the preferred embodiments of the present application and do not limit the scope of protection of the present application. Therefore, any equivalent changes made based on the structure, shape, and principle of the present application should be covered within the scope of protection of the present application.

LISTING OF REFERENCE SIGNS

1. Frame module
2. Seat module
3. Wheel module
4. Foot pedal module
41. Installation rack
42. Foot pedal
43. Locking pin

44. First elastic component
45. Installation groove
46. Installation part
47. Locking slot
5. Foldable module
51. First folding mechanism
52. Second folding mechanism
53. Linkage mechanism
54. Locking mechanism
541. Sliding seat
542. Movable pin
543. Second elastic component
544. Locking hole
55. Unlocking mechanism
551. Unlocking push rod
552. Unlocking head
553. Handle assembly
5531. Unlocking handle
5532. Alignment push rod
5533. Third elastic component
5534. Fourth elastic component
5535. Rotating slot
5536. Receiving slot
554. Bevel wedge surface
56. Supporting mechanism
61. Folding plate
62. Connecting plate
71. First hinge shaft
72. Second hinge shaft
73. Third hinge shaft
81. Installation cavity
82. Battery circuit module
83. Protective cover plate
84. Control module
91. Resetting ring
92. Resetting slider
93. Resetting spring
94. Sliding teeth
95. Resetting groove
10. Anti-loosening mechanism
101. Fixed tube
102. Sliding rod
103. Anti-loosening ring
104. Sliding ball
105. Pushing groove
111. Handle part
112. Sliding rod part
113. Linkage part.

What is claimed is:

1. A foldable electric wheelchair, comprising two framework modules arranged at intervals;

a seat module located between the two frame modules for a user to sit on;

a wheel module located at a bottom of the two frame modules and used to drive the two frame modules to move;

a foot pedal module located on a front side of the two frame modules for the user to step on; and a foldable module, wherein the foldable module comprises a first folding mechanism, a second folding mechanism, a linkage mechanism, a locking mechanism, and an unlocking mechanism; the first folding mechanism and the second folding mechanism are both provided between the two frame modules, and the linkage mechanism is provided between the first folding mechanism and the second folding mechanism to synchronously unfold or fold the first folding mechanism and the second folding mechanism; the locking mechanism is slidably provided outside the linkage mechanism, and a support mechanism is hinged between the locking mechanism and the first folding mechanism; when the locking mechanism slides to a predetermined position of the linkage mechanism, the locking mechanism and the linkage mechanism interlock with each other, so that the locking mechanism keeps the first folding mechanism in an unfolded state via the support mechanism, and the unlocking mechanism is slidably provided inside the linkage mechanism to release locking between the locking mechanism and the linkage mechanism;

wherein an installation cavity is provided in a middle of the two frame modules, a battery circuit module is provided inside the installation cavity, a protective cover plate is provided at a position corresponding to the installation cavity of the two frame modules, a control module is provided at a top of the two frame modules, and the control module, the battery circuit module, as well as the battery circuit module and the wheel module, are all electrically connected through preset wires arranged inside the two frame modules.

2. The foldable electric wheelchair according to claim 1, wherein each of the first folding mechanism and the second folding mechanism comprises two folding plates and a connecting plate, two sides of the two folding plates away from each other are hinged to the two frame modules, respectively, two sides of the connecting plate are hinged to two sides of the two folding plates adjacent to each other, and two ends of the linkage mechanism are fixed to the connecting plate of the first folding mechanism and the connecting plate of the second folding mechanism.

3. The foldable electric wheelchair according to claim 2, wherein a first hinge shaft is respectively provided on two sides of the connecting plate and between the two folding plates, a second hinge shaft is respectively provided between two sides of the locking mechanism and two support mechanisms, a hinge part is provided on a side of the connecting plate of the first folding mechanism facing the linkage mechanism, and a third hinge shaft is respectively provided between two hinge parts and two support mechanisms; and, when the first folding mechanism and the second folding mechanism are synchronously folded to a maximum extent, the first hinge shaft, the second hinge shaft and the third hinge shaft are arranged coplanar.

4. A foldable electric wheelchair, comprising two framework modules arranged at intervals;

a seat module located between the two frame modules for a user to sit on;

a wheel module located at a bottom of the two frame modules and used to drive the two frame modules to move;

a foot pedal module located on a front side of the two frame modules for the user to step on; and a foldable module, wherein the foldable module comprises a first folding mechanism, a second folding mechanism, a linkage mechanism, a locking mechanism, and an unlocking mechanism; the first folding mechanism and the second folding mechanism are both provided between the two frame modules, and the linkage mechanism is provided between the first folding mechanism and the second folding mechanism to synchronously unfold or fold the first folding mechanism and the second folding mechanism; the locking mechanism is slidably provided outside the linkage mechanism, and a support mechanism is hinged between the locking mechanism and the first folding mechanism; when the locking mechanism slides to a predetermined position of the linkage mechanism, the locking mechanism and the linkage mechanism interlock with each other, so that the locking mechanism keeps the first folding mechanism in an unfolded state via the support mechanism, and the unlocking mechanism is slidably provided inside the linkage mechanism to release locking between the locking mechanism and the linkage mechanism;

wherein the foot pedal module comprises an installation frame and a foot pedal, a rotating seat is provided at a front side of the installation frame, one end of the installation frame is rotatably provided on the rotating seat, and the foot pedal is provided at an end of the installation frame away from an installation portion for the user to step on.

5. The foldable electric wheelchair according to claim 4, wherein the locking mechanism comprises a sliding seat, a movable pin, and a second elastic member, wherein the sliding seat is slidably arranged outside the linkage mechanism, the movable pin is slidably arranged inside the sliding seat, and the second elastic member is arranged between the sliding seat and the movable pin for sliding the movable pin into contact with an outside of the linkage mechanism, the linkage mechanism is provided with a locking hole for inserting the movable pin, and when sliding to the predetermined position of the linkage mechanism, the movable pin is inserted into the locking hole; the unlocking mechanism comprises an unlocking push rod, an unlocking head, and a handle assembly; the unlocking push rod is slidably arranged inside the linkage mechanism, the unlocking head is arranged at one end of the unlocking push rod, and the unlocking head is provided with a bevel wedge surface; the handle assembly is arranged at an end of the unlocking push rod away from the unlocking head, and the handle assembly is used to push the unlocking push rod to slide, thereby pushing the movable pin out of the locking hole via the bevel wedge surface.

6. The foldable electric wheelchair according to claim 5, wherein the handle assembly comprises an unlocking handle, an alignment push rod, a third elastic member, and a fourth elastic member, the unlocking handle is slidably arranged at one end of the linkage mechanism away from the first folding mechanism, the alignment push rod is fixedly arranged at the end of the unlocking push rod away from the unlocking head, the unlocking handle is provided with a rotating groove adapted to rotation of the alignment push rod, and a bottom of the rotating groove is provided with a rotating groove adapted to the rotation of the alignment push rod, a receiving slot is defined at a bottom of the rotating groove adapted to the rotation of the alignment push rod, the third elastic member is provided between the unlocking handle and the linkage mechanism to push the unlocking handle to slide in a direction away from the alignment push rod, so that the alignment push rod is located in the rotating groove, the fourth elastic member is arranged between the unlocking handle and the linkage mechanism to drive the unlocking handle to rotate around an axis of the linkage mechanism, so as to align the alignment push rod and the receiving slot with each other.

7. The foldable electric wheelchair according to claim 6, wherein the fourth elastic member comprises a resetting ring, a resetting slider, and a resetting spring, wherein the resetting ring is slidably arranged on an outer circumference of the unlocking handle, and an inner circumference of the resetting ring is provided with first sliding teeth that mesh with the outer circumference of the unlocking handle, so that the unlocking handle has a degree of freedom to slide in the direction away from the alignment push rod, the resetting slider is fixedly arranged on an outer circumference of the resetting ring, and an inner circumference of the linkage mechanism is provided with second sliding teeth that mesh with the outer circumference of the unlocking handle, a resetting groove of the linkage mechanism is arranged axially, and the resetting slider is slidably provided on the resetting groove, and the resetting spring is provided between the resetting groove and the resetting slider to drive the resetting ring to rotate around the axis of the linkage mechanism.

8. The foldable electric wheelchair according to claim 7, wherein an anti-loosening mechanism is provided between the fourth elastic member and the locking mechanism, the anti-loosening mechanism comprises a fixed tube, a sliding rod, and an anti-loosening ring, the fixed tube extends axially along the linkage mechanism, and the fixed tube is fixedly provided inside the linkage mechanism, the sliding rod is slidably provided inside the fixed tube, the anti-loosening ring is fixedly provided at one end of the sliding rod, a sliding ball is provided at one end of the sliding rod away from the anti-loosening ring, the resetting ring is provided with a pushing groove arranged along an axial direction of the linkage mechanism, the sliding ball is slidably provided on the pushing groove, and the resetting ring is rotated around the linkage mechanism, so that the sliding ball drives the anti-loosening ring to abut against the movable pin through the sliding rod when the alignment push rod and the receiving slot are aligned with each other.

9. The foldable electric wheelchair according to claim 8, wherein there are two anti-loosening mechanisms and two locking mechanisms, and the two anti-loosening mechanisms and the two locking mechanisms are arranged misaligned from each other along the axial direction of the linkage mechanism.

* * * * *